United States Patent [19]

Baranoff

[11] 4,284,260
[45] Aug. 18, 1981

[54] AUTOMATIC DISCHARGE VALVE FOR LIQUIDS

[76] Inventor: Nicolas Baranoff, Arenales St. 2636, 1602 Florida (Province of Buenos Aires), Argentina

[21] Appl. No.: 941,844

[22] Filed: Sep. 12, 1978

[30] Foreign Application Priority Data

Sep. 15, 1977 [AR] Argentina ............................. 269209
Sep. 15, 1977 [AR] Argentina ............................. 269210

[51] Int. Cl.³ .......................................... F16K 31/145
[52] U.S. Cl. ..................................... 251/45; 92/98 R; 251/61.1
[58] Field of Search ................ 92/98 R, 100; 251/44, 251/45, 46, 61.1

[56] References Cited

U.S. PATENT DOCUMENTS 3,791,619  2/1974  Pett .......................................... 251/45

Primary Examiner—Martin P. Schwadron
Assistant Examiner—G. L. Walton
Attorney, Agent, or Firm—Browdy & Neimark

[57] ABSTRACT

In a discharge valve for liquids, and especially for use in lavatories, comprising two bodies provided with hollow spaces separated from each other by a circular diaphragm, the central portion of which normally seals an inlet conduit for water which, jointly with the discharge conduit for water, opens into one of said hollow spaces, while the other one of said hollow spaces is connected by means of respective channels provided with flow restrictors, one to the inlet for water and the other one to the outlet for water, the said channels crossing the peripheral zone of said diaphragm, the following combination of improvements:

(a) The channel intercommunicating the hollow spaces opens in the water inlet conduit in such a manner as to proceed upstream;
(b) The guide of the piston of the plug sealing the water outlet ends in a projection in the shape of a truncated cone;
(c) The sealing diaphragm has a thickening in the shape of a truncated cone; and
(d) The zones surrounding the flat contact surfaces between stiff materials and elastomeric materials have circular projections concentrical with their orifices provided in any one of said two surfaces.

7 Claims, 9 Drawing Figures

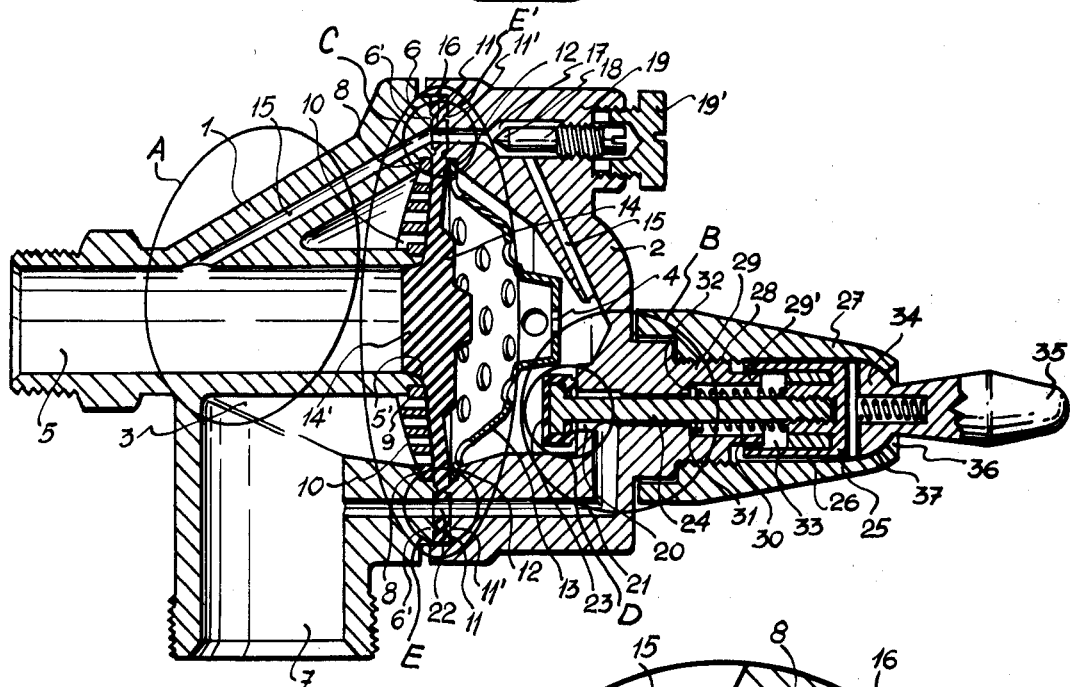
Fig.1 PRIOR ART
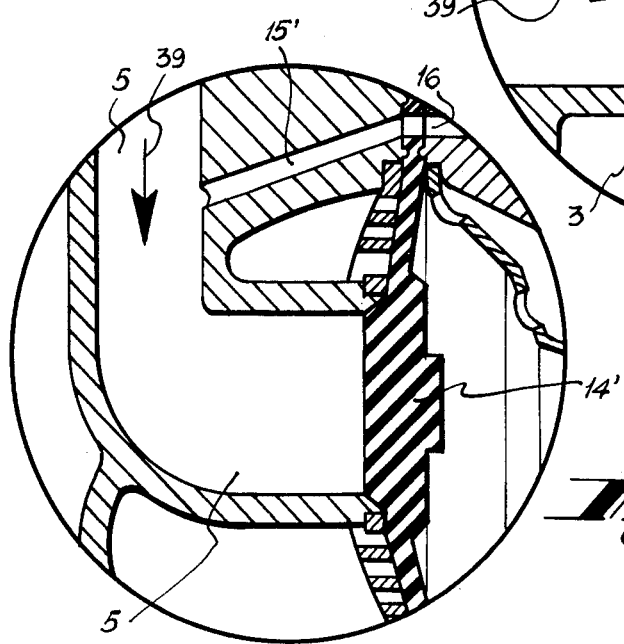
Fig.2
Fig.3

AUTOMATIC DISCHARGE VALVE FOR LIQUIDS

BACKGROUND OF THE INVENTION

1. Field of the Invention

The present invention refers to an automatic discharge valve for liquids, especially for use in waterclosets, that does not suffer from the hydraulic knockdown in sudden discharges of a body of water. Especially, the present invention refers to a valve apt to be used at different pressures of water, from 0.15 to 7 atmospheres, approximately, that is, at the pressures normally found in urban sanitary installations.

More particularly, the present invention refers to a novel combination of improvements incorporated in such valves.

2. Description of the Prior Art

U.S. Pat. No. 2,868,492 granted on Jan. 13, 1959 to Vittorio Volcov and Nicolas Baranoff discloses an automatic discharge valve for liquids that does not suffer from hydraulic knock-down and is apt to be applied in urban sanitary installations within the range of pressures usual in such installations. The principal novelty of this patent consists in the provision of a damping chamber within the discharge valve, which absorbs the pressure formed upon closure and thereby eliminates the waterhammer. The correct operation is obtained with the aid of elastic sealing means, comprising a cylindrical rubber piston with a plurality of rings at its circumference allowing a full fit in the sealing.

As a further development of this novel idea, applicant obtained on Oct. 20, 1964 Argentine Pat. No. 141,444 which permits the elimination of the elastic body 11 in the damping chamber 10 of the said U.S. patent, without losing thereby the advantages offered by U.S. Pat. No. 2,868,492.

Said Argentine Pat. No. 141,444 describes a valve of the above mentioned type comprising two bodies provided with hollow spaces separated from each other by a circular diaphragm, the central portion of which normally seals an inlet conduit for water which, jointly with the discharge conduit for water, opens into one of the hollow spaces, the other one of the hollow spaces being connected by means of respective channels, provided with flow restrictors, one to the water inlet and the other one to the water outlet, the channels crossing the peripheral zone of the diaphragm.

It has been discovered that upon entering into this valve the water carries along particles such as those that might be introduced into the storage tank when same is cleaned by personnel wearing boots, or particles entering in any other way, and some of these particles penetrate into the channel provided with a flow restrictor connected with the inlet for water, getting as far as the corresponding flow restrictor and further restricting its section. This reduction of the section of the flow restrictor affects the operation of the valve causing the closure time of the inlet conduit to be longer than it should be which in turn results in an unnecessary loss of water and in an excessive protraction of the interval in which the valve may be used for the next discharge. In the worst case a total obstruction of the flow restrictor may ensue, and then the valve becomes inoperative until such time as it has been disassembled in order to eliminate obstruction, which operation, as a rule, is not within the scope of persons not specialized in this type of valve.

It has been discovered that upon actuating the lever arm causing the discharge of water, between the piston of the plug (which normally seals the communication between the hollow space in which it is situated and the discharge conduit) and the nozzle in which it is situated, a water leak is caused, as at this point it is not possible to place a plug, inasmuch as it is, at the same time, the air inlet into the hollow space. This leak of water causes an ugly appearance outside the valve.

It has been discovered that the diaphragm described and illustrated in U.S. Pat. No. 141,444 suffers from certain drawbacks and therefore certain alterations have been made in same which constitute the novelty of this invention and consist in giving a conical shape to the portion of the diaphragm comprised between the circumferential edge compressed by the two bodies comprising the valve and its central thickening; providing this circumferential edge with radial fingers enabling a better centering and giving an increased thickness to the portions of the circumferential edge at points corresponding to the passage of fluid supply and discharge conduits, increasing thereby the pressure in the hollow space opposite the one carrying the supply and evacuation conduits for discharge water; providing a concavity at its center for a better seating of the central portion of the supply conduit for discharge water; and surrounding this concavity with a reinforcement ring.

Finally, it has been discovered that when manufacturing from plastic material the two bodies which, in assembled condition, form the valve, due to properties of the plastic material, not all the surfaces that should be flat are really so, especially those surrounding perforations having a small diameter in which shrink-holes may appear making them slightly conical. Such tapers prevent a tight sealing.

SUMMARY OF THE INVENTION

In order to avoid these drawbacks, the discharge valve described in Argentine Pat. No. 141,444 has been improved by introducing the following improvements which, as a whole, constitute the improved discharge valve for liquids which is the object of the present invention. 1. Channel 15 intercommunicating the hollow spaces 3, 4 of the bodies 1, 2 of the valve (see FIG. 1) and starting at the water inlet 5, has at least a first span 15' forming a sharp angle with the axis of the water inlet 5, at which it has its starting point, and is directed upstream and subsequently, if necessary, towards the corresponding hollow space 4. 2. To reduce leaking of the valve to practically insignificant values, the guide of piston 24 of the sealing plug 23 of the water outlet of hollow space 4, the pressure of which keeps the water feeding conduit for the valve closed, has, at its side facing the plug 23, a shape of a truncated cone whose smaller base is the one closest to the plug. 3. Circular diaphragm 14, which at its center has a thickening 14' shaped like a truncated cone and at its periphery a flat circumferential edge provided with passages for the liquid conduits to and from the hollow space opposite the one into which open the inlet and outlet conduits for discharge liquid, has a portion comprised between the thickening and the circumferential edge in the shape of the shell of a truncated cone, and presents at zones of the circumferential edge adjacent the passages slight thickenings, and at the zone opposite the thickening in the shape of a truncated cone, a concavity surrounded by a reinforcement ring. 4. The zone surrounding the holes provided for on flat surfaces made of a stiff material in contact with flat surfaces made of an elastomeric material, is provided with circular projections concentric with, but of a larger diameter than, such holes, with the projections emerging from any one of the surfaces.

DESCRIPTION OF THE DRAWINGS

FIG. 1 shows a known valve (that of Argentine Pat. No. 141,444), in a cross section according to a plane which contains the axes of the water inlet and discharge conduits. The improved parts, objects of the present application, have been encircled in this figure;

FIG. 2 is the portion encircled in FIG. 1, indicated with an "A", with one of the improvements corresponding to a valve in which the axes of the inlet and discharge conduits for water are perpendicular to each other;

FIG. 3 is the same as FIG. 2 but for a valve in which the inlet and discharge conduits for water are coaxial;

DESCRIPTION OF THE PREFERRED EMBODIMENT

Figure 4:
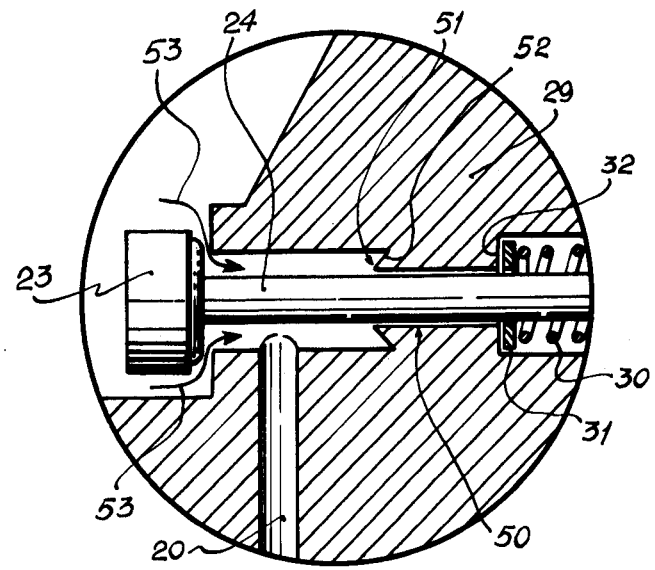
FIG. 4 is the improved guide of the piston corresponding to the encircled part, indicated with a "B", in FIG. 1.

We shall now describe the improvements for which protection is sought, comparing them with what is already known in the art (and illustrated in FIG. 1).

As may be seen from FIG. 1, water arriving through conduit 5 is stopped by thickening 14' of diaphragm 14 and may enter into hollow space 4 only by way of channel 15, hole 16 of diaphragm 14 and flow restrictor 17—18—19. The outlet of hollow space 4 is obstructed by plug 23 fixed on piston 24 which seals conduit 21 passing through the orifice 22 of diaphragm 14 and opens into discharge conduit 7. Under these conditions the valve does not cause a discharge of water through the conduit 7, because the pressure in hollow space 4 is equal to that of conduit 5 and the surface of the thickening 14' of diaphragm 14 is smaller than that of the whole diaphragm 14. In order to produce a discharge of water, at 7, the pressure in hollow space 4 is substantially reduced, displacing plug 23, the piston of which is actuated by hand by means of lever arm 35, in which case the pressure in the hollow space 4 diminishes upon clearing the water outlet through conduit 21 to discharge 7. The closure of conduit 5 is reinstated when water entering from same through channel 15 into hollow space 4 (the outlet of which has been sealed by plug 23 when lever arm 35 has been released) builds up again the pressure necessary for the same, multiplied by the surface of diaphragm 14, to be higher than the pressure of water coming through conduit 5, multiplied by the surface of thickening 14'.

Figure 9:
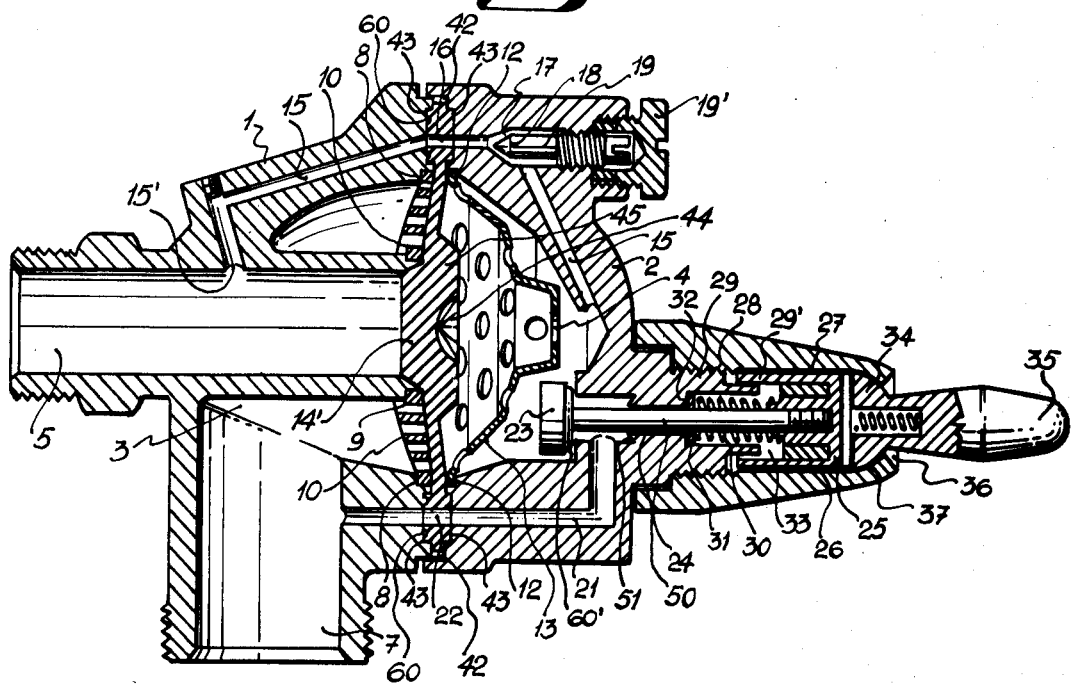
FIG. 9 is a section, the same as in FIG. 1, which includes all the improvements, the combination of which constitutes the object of this application.

In the improved valve shown in FIG. 9, the initial span of conduit 15 is modified as shown, in a bigger scale, in FIGS. 2 and 3 for conduits 5 and 7 intersecting each other at right angles or for coaxial conduits, respectively. As may be seen the initial span 15' of conduit 15 starting in water inlet conduit 5 forms with its axis a sharp angle, but, instead of being directed downstream, as shown in FIG. 1, it is directed upstream. It may be easily seen from FIGS. 2 and 3 that any particle that might obstruct the restriction 17—18—19 and travel through conduit 5 as indicated by arrow 39, has considerable probabilities of being prevented from penetrating into span 15', contrary to what happens in the case of FIG. 1 in which the initial portion of conduit 15 presents considerable probabilities favoring the penetration of such a particle into the conduit 15 and the subsequent obstruction of the restriction 17—18—19.

FIG. 4 shows another improvement which differentiates the new valve from that which is shown in FIG. 1 (the prior art). This new valve consists in modifying the portion of guide 50, formed by a bore sunk into nozzle 29 at its end nearer plug 23, to form a ring 51 having a triangular section so that there remains a truncated cone portion 52, the smaller basis of which is nearer plug 23. Due to this, when plug 23 is detached from its seat by actuating the valve by means of lever 35 and water enters into chamber 20 following the path indicated by arrows 53, it does not interfere directly with the interspace between piston 24 and guide 50 but strikes against the sloping walls of ring 51 and swirls loosing its component parallel to the axis of piston 24. Due to this, the quantity of water entering into the interspace during the short period during which hollow space 4 is under pressure (after the plug 23 becomes detached from its seat) is very small, and immediately the suction effect caused by the stream of water descending through conduit 7 is produced, which suction effect causes air to enter into hollow space 4 through the interspace, and this air sweeps along any small quantity of water that has flowed into the interspace towards chamber 20.

Figure 5:
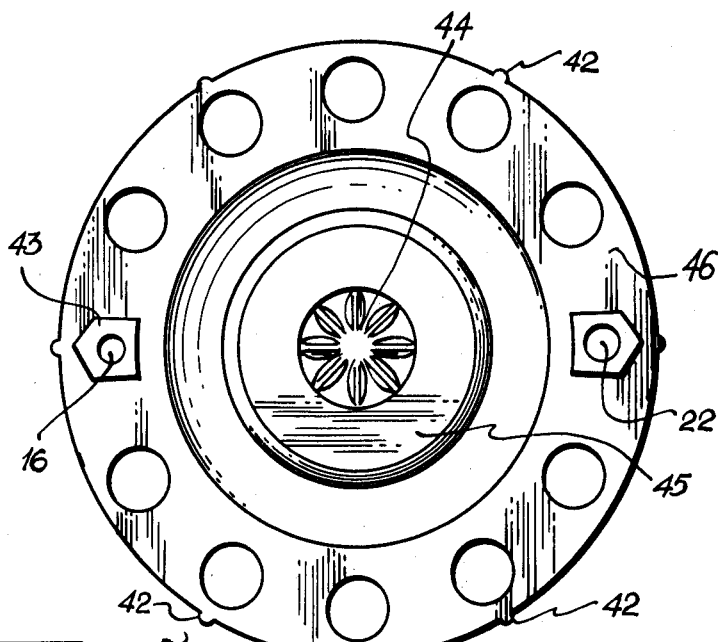
FIGS. 5 and 6 show the improved diaphragm which replaces the diaphragm shown in FIG. 1 and encircled with a "C", FIG. 5 being a side view which shows the face opposite to the one having the central thickening in the shape of a truncated cone, and FIG. 6 being a cross section, diametrally, of the improved diaphragm.
Figure 6:
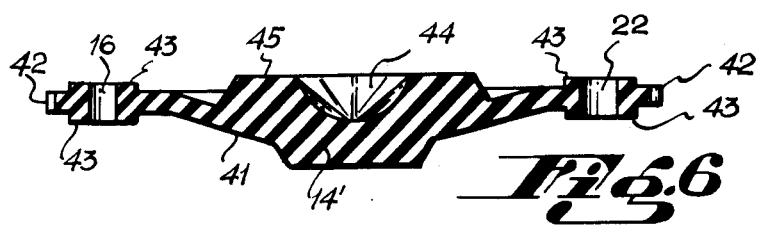

As may be appreciated in FIGS. 5 and 6, the improved diaphragm keeps the central thickening in the shape of a truncated cone 14' and the orifices 16 and 22 and those serving for the passage of the fastening screws for bodies 1 and 2 of the embodiment shown in FIG. 1; however, the zone 41 between central thickening 14' and the flat circumferential edge 46 is modified to be shaped as the shell of a truncated cone in order to enable it to adjust to grid 10 when the valve seals the outlet of conduit 5 for the supply of discharge water. Furthermore, at the zones surrounding orifices 16 and 22 it carries a thickening 43 with the object of compensating for depressions caused in the plastic material when cooling too soon during its molding at the zones corresponding to the orifices 16 and 22. On the other hand, at the back of central thickening 14', there is a concavity 44 with the object of achieving a better seating of the thickening 14' in the shape of a truncated cone at the end of conduit 5 and a better fit of diaphragm 14 on grid 13 leaving a larger space for the water within the hollow space 3. Concavity 44 is surrounded by a reinforcement ring 45.

In order to achieve the self-centering of diaphragm 14, the same is provided, moreover, with external, radial fingers or projections 42.

To compensate for the differences which take place in the formation of plastic parts which prevent a proper adjustment between the stiff parts and the elastomeric parts, the flat surfaces of stiff material, or those of elastomeric material, which face each other, are provided with annular projections concentric with the holes or perforations extending through both materials.

Figure 7:
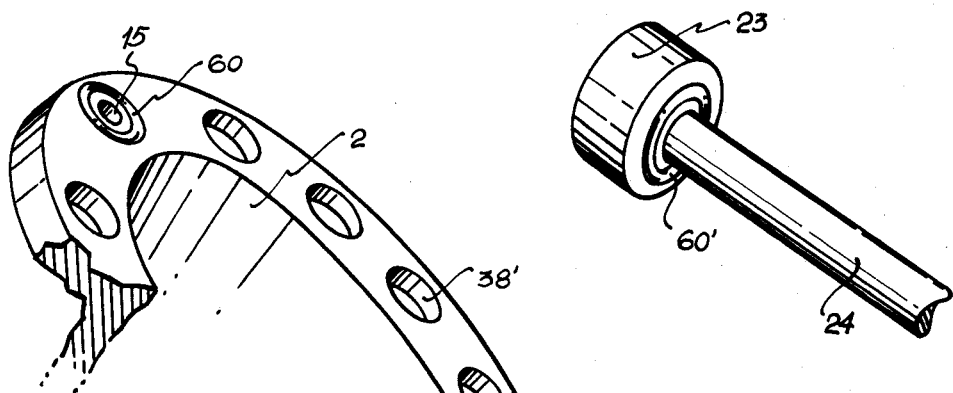
FIG. 7 shows, in perspective, the support zone for the plug (encircled in FIG. 1 with a circumference D) provided with an elastomeric projection in accordance with this invention.

In the case of FIG. 7, the plug 23 coated with elastomeric material presents the circular projection 60' surrounding the piston 24 penetrating into a guide (shown in FIG. 4) constituted by a hole provided in the stiff material constituting the nozzle 29. The circular projection 60' is coaxial with the hole in which is guided the piston 24, and its purpose is to compensate for possible shrink-holes in the stiff material from which nozzle 29 is made and to ensure thus the tight sealing of plug 24.

Figure 8:
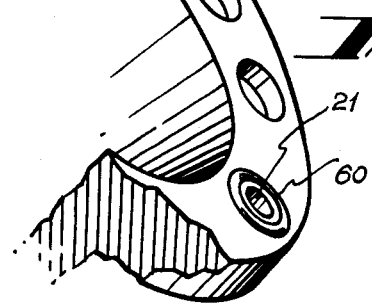
FIG. 8 shows, in perspective, the two zones (encircled in FIG. 1 with respective circumferences E and E'), wherein the opposite faces of the two bodies constituting the valve and separated by the flat perimetrical zone of the diaphragm, are pierced by the water supply holes or perforations to one of the hollow spaces of the valve and are provided with stiff annular projections in accordance with this invention.

In the case of FIG. 8 we have again a body 2 made of a stiff material, on which is placed the diaphragm 14 (FIG. 9) made of an elastomeric material, and holes 15 and 21 (FIG. 8) are provided through which pass, piercing the diaphragm 14, the water supply conduits to one of the two hollow spaces of the valve. In accordance with the improvemet shown in this figure, the holes 15 and 21 are surrounded by an annular projection 60 made of a stiff material (the same as of body 2 and monolithic with the latter) coaxial with holes 15 and 21 and serving the purpose of compensating for possible shrink-holes, thus ensuring the tightness of the coupling completed by means of diaphragm 14.

It should be noted that these annular projections may be provided in either one of the stiff or elastomeric materials, inasmuch as in both cases they serve the same purpose. It is to be understood, however, that the diameter of the annular projections should be larger than that of the holes with which they are concentric.

Therefore, I claim:

1. In an automatically discharged valve for liquids, comprising a first housing portion, a second housing portion, and a circular diaphragm, having a central sealing portion, therebetween, said first and second housing portions being made of rigid materials and said diaphragm being made of elastomeric material, wherein said first housing portion includes concentric intake and discharge pipes, said intake pipe being sealable by said central portion of said diaphragm and said intake and discharge pipes communicating with a first hollow space when said diaphragm does not seal said intake pipe, and wherein said second housing portion includes a second hollow space therein on the side of said diaphragm opposite said first hollow space, the valve further including first channel means, crossing a peripheral zone of said diaphragm, for intercommunicating said second hollow space and said intake pipe; a flow restrictor within said first channel means; second channel means, crossing a peripheral zone of said diaphragm, for intercommunicating said second hollow space and said discharge pipe; and sealing means for releasably sealing said second channel means from said second hollow space, said sealing means including a sealing plug at least the sealing surface of which being made of elastomeric material, a piston connected to said sealing plug, a guide channel in said second housing portion in which said piston is guided, and externally actuatable release means connected to said piston for causing said plug to move between sealing and non-sealing positions, wherein said guide channel has a first portion having a first cross-sectional area, intercommunicating said second hollow space and said second channel means when said plug is not in the sealing position, and a second portion, of cross-sectional area smaller than said first cross-sectional area, surrounding the remainder of said piston, the improvements wherein:

(a) said first channel means has a first span, in communication with said intake pipe, forming an angle of greater that 90° with the direction of liquid flow in said intake pipe, when the valve is open in use, thereby directing the liquid upstream, and a second portion intercommunicating said first span and said second hollow space, whereby the probability of any particles in the liquid flow entering said first channel means is substantially diminished;

(b) the end of said first portion of said guide channel of said sealing means, opposite the end opening into said second hollow space, has the shape of a truncated cone, the smaller basis of which is closer to said end opening into said second hollow space, whereby any leakage through said second portion of said guide means is substantially eliminated;

(c) said diaphragm has a peripheral flat circumferential edge which is sealed between said first and second housing portions and having passages therein for said first and second channel means, the zones of said circumferential edge surrounding said passages having slight thickenings, and a portion, between said central sealing portion and said peripheral edge, in the shape of the shell of a truncated cone, and wherein said central sealing portion comprises a central thickening having the shape of a truncated cone on the side facing said intake pipe and a concavity surrounded by a reinforcement ring on the opposite side, whereby improved sealing and seating of the diaphragm is obtained; and (d) all zones surrounding holes provided in flat surfaces of rigid material in contact with flat surfaces of elastomeric material are provided with annular projections concentric with, but having a diameter larger than, the holes, said projections emerging from either the surface of rigid material or the surface of elastomeric material, whereby improved sealing at said zones is obtained.

2. A valve according to claim 1, wherein said flat circumferential edge of said diaphragm externally presents self-centering radial projections.

3. In an automatically discharged valve for liquids, comprising a first housing portion, a second housing portion, and a circular diaphragm, having a central sealing portion, therebetween, said first and second housing portions being made of rigid materials and said diaphragm being made of elastomeric material, wherein said first housing portion includes concentric intake and discharge pipes, said intake pipe being sealable by said central portion of said diaphragm and said intake and discharge pipes communicating with a first hollow space when said diaphragm does not seal said intake pipe, and wherein said second housing portion includes a second hollow space therein on the side of said diaphragm opposite said first hollow space, the valve further including first channel means, crossing a peripheral zone of said diaphragm, for intercommunicating said second hollow space and said intake pipe; a flow restrictor within said first channel means; second channel means, crossing a peripheral zone of said diaphragm, for intercommunicating said second hollow space and said discharge pipe; and sealing means for releasably sealing said second channel means from said second hollow space, said sealing means including a sealing plug at least the sealing surface of which being made of elastomeric material, a piston connected to said sealing plug, a guide channel in said second housing portion in which said piston is guided, and externally actuatable release means connected to said piston for causing said plug to move between sealing and non-sealing positions, wherein said guide channel has a first portion having a first cross-sectional area, intercommunicating said second hollow space and said second channel means when said plug is not in the sealing position, and a second portion, of cross-sectional area smaller than said first cross-sectional area, surrounding the remainder of said piston, the improvements wherein:

said first channel means has a first span, in communication with said intake pipe, forming an angle of greater than 90° with the direction of liquid flow in said intake pipe, when the valve is open in use, thereby initially directing the liquid upstream, and a second portion intercommunicating said first span and said second hollow space, whereby the probability of any particles in the liquid flow entering said first channel means is substantially diminished.

4. A valve in accordance with claim 3, wherein the end of said first portion of said guide channel of said sealing means, opposite the end opening into said second hollow space, has the shape of a truncated cone, the smaller basis of which is closer to said end opening into said second hollow space, whereby any leakage through said second portion of said guide means is substantially eliminated.

5. A valve in accordance with claim 3 or 4, wherein said diaphragm has a peripheral flat circumferential edge which is sealed between said first and second housing portions and having passages therein for said first and second channel means, the zones of said circumferential edge surrounding said passages having slight thickenings, and a portion between said central sealing portion and said peripheral edge, in the shape of the shell of a truncated cone, and wherein said central sealing portion comprises a central thickening having the shape of a truncated cone on the side facing said intake pipe and a concavity surrounded by a reinforcement ring on the opposite side, whereby improved sealing and seating of the diaphragm is obtained.

6. In an automatically discharged valve for liquids, comprising a first housing portion, a second housing portion, and a circular diaphragm, having a central sealing portion, therebetween, said first and second housing portions being made of rigid materials and said diaphragm being made of elastomeric material, wherein said first housing portion includes concentric intake and discharge pipes, said intake pipe being sealable by said central portion of said diaphragm and said intake and discharge pipes communicating with a first hollow space when said diaphragm does not seal said intake pipe, and wherein said second housing portion includes a second hollow space therein on the side of said diaphragm opposite said first hollow space, the valve further including first channel means, crossing a peripheral zone of said diaphragm, for intercommunicating said second hollow space and said intake pipe; a flow restrictor within said first channel means; second channel means, crossing a peripheral zone of said diaphragm, for intercommunicating said second hollow space and said discharge pipe; and sealing means for releasably sealing said second channel means from said second hollow space, said sealing means including a sealing plug at least the sealing surface of which being made of elastomeric material, a piston connected to said sealing plug, a guide channel in said second housing portion in which said piston is guided, and externally actuatable release means connected to said piston for causing said plug to move between sealing and non-sealing positions, wherein said guide channel has a first portion having a first cross-sectional area, intercommunicating said second hollow space and said second channel means when said plug is not in the sealing position, and a second portion, of cross-sectional area smaller than said first cross-sectional area, surrounding the remainder of said piston, the improvements wherein:

the end of said first portion of said guide channel of said sealing means, opposite the end opening into said second hollow space, has the shape of a truncated cone, the smaller basis of which is closer to said end opening into said second hollow space, whereby any leakage through said second portion of said guide means is substantially eliminated.

7. A valve in accordance with claim 6, wherein said diaphragm has a peripheral flat circumferential edge which is sealed between said first and second housing portions and having passages therein for said first and second channel means, the zones of said circumferential edge surrounding said passages having slight thickenings, and a portion between said central sealing portion and said peripheral edge, in the shape of the shell of a truncated cone, and wherein said central sealing portion comprises a central thickening having the shape of a truncated cone on the side facing said intake pipe and a concavity surrounded by a reinforcement ring on the opposite side, whereby improved sealing and seating of the diaphragm is obtained.

* * * * *